Bevan & Fleming,
Food Warmer.
No. 76,390.        Patented Apr. 7, 1868.
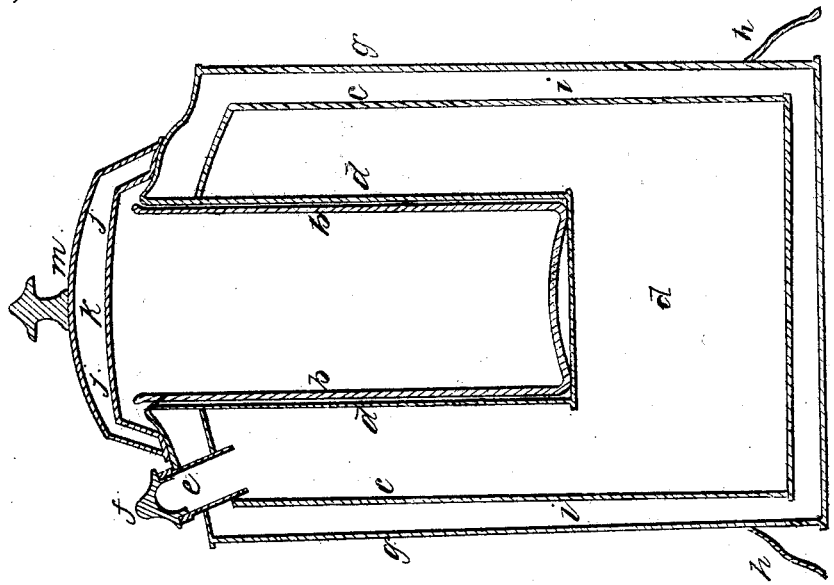
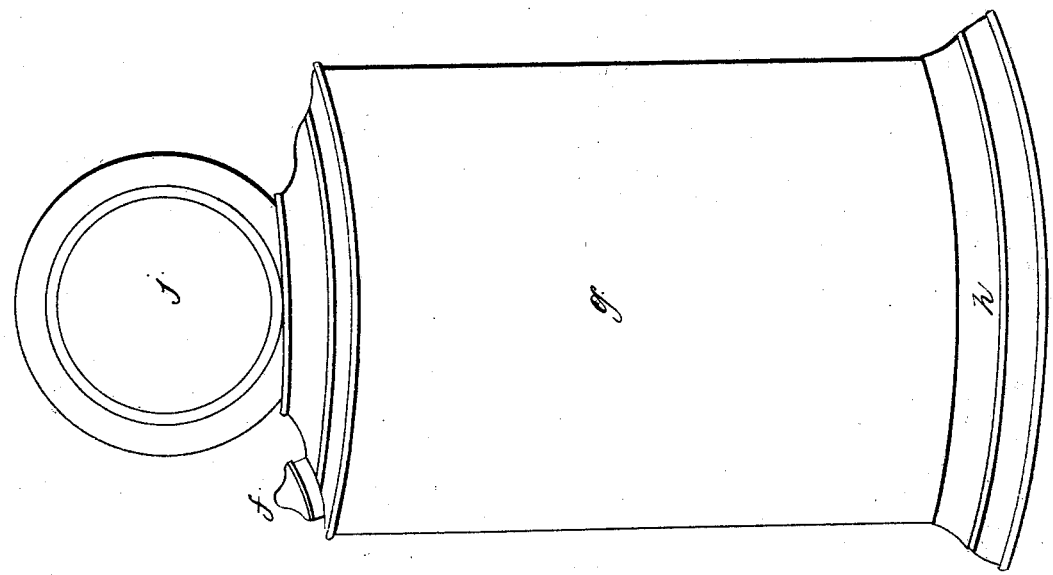
Witnesses:
Wm C. Dey
C. C. Livings
Inventors:
Edward Bevan and
Margaret Fleming Adx of Abel Fleming
by their Attorney T. S. Sletore

UNITED STATES PATENT OFFICE.

EDWARD BEVAN, OF BIRKENHEAD, FOR HIMSELF AND MARGARET FLEMING, OF SHIPSTON-ON-STOUR, ENGLAND, ADMINISTRATRIX OF THE ESTATE OF ABEL FLEMING, DECEASED, ASSIGNORS TO EDWARD BEVAN.

IMPROVEMENT IN DEVICES FOR KEEPING FOOD WARM.

Specification forming part of Letters Patent No. 76,390, dated April 7, 1868.

*To all whom it may concern:*

Be it known that we, EDWARD BEVAN, of Birkenhead, in the county of Chester, England, and ABEL FLEMING, late of Birkenhead, aforesaid, deceased, represented by his legal representative, MARGARET FLEMING, of Shipston-on-Stour, in the county of Warwick, England, have invented certain Improved Means and Apparatus for Warming and Keeping Warm Articles of Food, particularly infants' and invalids' food; and we do hereby declare that the following is a full and exact description thereof—that is to say:

The object of the invention is to provide for nurses, mothers, and others an inexpensive and portable apparatus in which food can be warmed or kept warm and ready for use for many hours without application of fire to the said apparatus, and without renewing the heating means or agent. Milk and other like food for infants and invalids can be warmed from time to time, as required, or kept warm during the whole night, without danger of being burned or being appreciably deteriorated in quality.

The utility of the invention and the advantages to be derived from its use in the nursery, sick-room, and elsewhere are obvious.

The means or agents which we employ for supplying the heat to warm articles of food is hot water or other hot liquid or substance, such as oil and sand. As hot water is more suitable than any other liquid or substance, we will hereinafter speak of the heating agent as hot water. This—that is, the hot water—is fed to the apparatus from any available source or vessel at boiling or other temperature, according to the number of hours it may be desired to keep the apparatus in use. It is by transmission of heat from the said hot water within the apparatus that the food is warmed, and by a jacket of still air or other insulator that the heat is prevented from being rapidly dissipated into the surrounding atmosphere.

That the said apparatus, which we have denominated the "thermoterion," and which may be made of metal, porcelain, or other suitable material, may be readily understood, we have attached hereto a sheet of illustrative drawings—

Figure 1 being a perspective view with the lid open, and Fig. 2 a vertical section, the lid being closed.

Like letters of reference denote the same parts in both views.

$a$ is a permanent inner casing inclosing the food-space. For cleanliness a readily-removable glass vessel (marked $b$) is used to contain the food.

$c$ is an intermediate annular casing or vessel, and $d$ is the space for hot water, which is supplied through the opening $e$, closed by a cap, $f$, or its equivalent.

$g$ is the outer vessel or case, with flanged base-piece $h$. Between $c$ and $g$ there is a space, $i$, for a jacket of air. We prefer to allow the air to remain quite still. A small opening or several small openings in the case, leaving the air in $i$ in communication with the surrounding atmosphere, does but small harm.

$j$ is a lid, with air-space $k$ between $j$ and the outer part, $m$.

Although the spaces $i$ and $k$ are here shown with air only therein it is obvious that they might be filled or partially filled with feathers, wool, felt, charcoal, or other so-called "heat non-conductors."

We would have it distinctly understood, however, that ponderable substances are not nearly so good insulators as air and other gaseous fluids. In some instances the outer vessel or case, $g$, might be dispensed with and felt or some other so-called "insulator" used; but this, it will be obvious, would merely be a colorable imitation of this invention.

It will be obvious, too, the form of this vessel might be altered. In the one shown in the sheet of drawings, which is made to a scale of six inches to the foot, the relative proportions of parts which we prefer are clearly delineated.

From the description above given and the drawings any skilled workman will be able to manufacture our said apparatus. We have found sheet metal the most convenient material to make it of. To use it it is only necessary to unscrew the cap $f$, pour hot water through a funnel or otherwise and the opening e into the space d; then, when charged, refix the cap f and close the lid. The food to be warmed would be placed in a or in the vessel b, formed to fit therein.

Having now described the nature of our said invention, and particularized the same by describing the most complete form of the apparatus with which we are acquainted, we would have it understood that what we claim is—

The within-described means or apparatus for warming and keeping warm articles of food, consisting substantially of the removable vessel b, heating agent, space, and vessel a d c, air-space and vessel i g, or its equivalent, and a non-conducting cover, combined in the manner set forth.

In testimony whereof we have hereunto set our names in presence of two subscribing witnesses.

EDWARD BEVAN.
MARGARET FLEMING.

Witnesses:
JOHN P. KING,
JOSEPH RAY.